US 8,255,065 B2

(12) United States Patent
Lu et al.

(10) Patent No.: US 8,255,065 B2
(45) Date of Patent: Aug. 28, 2012

(54) MOBILE FUNCTION BLOCK FOR A PLC BASED DISTRIBUTED CONTROL SYSTEM

(75) Inventors: Yan Lu, West Windsor, NJ (US); George Lo, Plainsboro, NJ (US); Dong Wei, Edison, NJ (US)

(73) Assignee: Siemens Aktiengesellschaft, Munich (DE)

( * ) Notice: Subject to any disclaimer, the term of this patent is extended or adjusted under 35 U.S.C. 154(b) by 579 days.

(21) Appl. No.: 12/427,203

(22) Filed: Apr. 21, 2009

(65) Prior Publication Data

US 2009/0276060 A1 Nov. 5, 2009

Related U.S. Application Data

(60) Provisional application No. 61/050,296, filed on May 5, 2008.

(51) Int. Cl.
G05B 11/01 (2006.01)
G05B 15/00 (2006.01)

(52) U.S. Cl. ............ 700/21; 700/18; 700/9; 700/11; 700/83; 700/86; 700/87; 700/79

(58) Field of Classification Search .............. 700/18, 700/9, 11, 83, 21, 86, 87, 79
See application file for complete search history.

(56) References Cited

U.S. PATENT DOCUMENTS

| 5,485,620 | A | * | 1/1996 | Sadre et al. ............ 700/18 |
| 6,014,612 | A | * | 1/2000 | Larson et al. .......... 700/11 |
| 6,047,222 | A | * | 4/2000 | Burns et al. ........... 700/79 |
| 6,192,281 | B1 | * | 2/2001 | Brown et al. .......... 700/83 |
| 6,366,300 | B1 | * | 4/2002 | Ohara et al. ........... 700/83 |
| 6,377,859 | B1 | * | 4/2002 | Brown et al. .......... 700/79 |
| 6,424,872 | B1 | * | 7/2002 | Glanzer et al. ........ 700/18 |
| 6,594,530 | B1 | * | 7/2003 | Glanzer et al. ........ 700/86 |
| 6,643,555 | B1 | * | 11/2003 | Eller et al. ............ 700/83 |
| 6,999,824 | B2 | * | 2/2006 | Glanzer et al. ........ 700/18 |
| 7,114,155 | B2 | * | 9/2006 | Stripf et al. ........... 700/18 |
| 7,167,762 | B2 | * | 1/2007 | Glanzer et al. ........ 700/18 |
| 7,225,037 | B2 | * | 5/2007 | Shani ................... 700/18 |
| 7,233,830 | B1 | * | 6/2007 | Callaghan et al. ..... 700/19 |
| 7,269,464 | B2 | * | 9/2007 | Phillips et al. ........ 700/18 |
| 7,272,457 | B2 | * | 9/2007 | Glanzer et al. ........ 700/83 |
| 7,272,458 | B2 | * | 9/2007 | Tomita ................. 700/18 |
| 7,292,900 | B2 | * | 11/2007 | Kreidler et al. ....... 700/83 |
| 7,299,099 | B1 | * | 11/2007 | Divelbiss et al. ...... 700/18 |
| 7,486,999 | B2 | * | 2/2009 | Glanzer et al. ........ 700/18 |
| 7,693,581 | B2 | * | 4/2010 | Callaghan et al. ..... 700/19 |
| 7,788,476 | B2 | * | 8/2010 | McNutt et al. ........ 700/11 |

(Continued)

OTHER PUBLICATIONS

Moeller GmbH, "Closed-Loop Control Toolbox APP-RTT-E-GB", Jun. 1999, obtained online at www.moeller.net, Hein-Moeller—Str. 7-11, 53115 Bonn, Germany.*

(Continued)

Primary Examiner — Mohammad Ali
Assistant Examiner — Kelvin Booker

(57) ABSTRACT

Methods and architectures are described that provide function block mobility between PLCs. Each PLC configured with Mobile Function Blocks (MFBs) may forward and execute MFBs from each other. To enable MFB mobility over a communication bus, each PLC having one or more configured MFBs requires a Communication Function Block (CFB) and an MFB directory data block. Each PLC maintains an MFB directory data block to store its MFB directory which is used when other PLCs send requests to check the availability of MFBs they need to run new tasks.

23 Claims, 5 Drawing Sheets

U.S. PATENT DOCUMENTS

| | | | | |
|---|---|---|---|---|
| 7,827,022 | B2* | 11/2010 | Kline, Jr. | 700/86 |
| 7,941,239 | B2* | 5/2011 | Ikegami et al. | 700/83 |
| 7,949,418 | B2* | 5/2011 | Araki et al. | 700/83 |
| 7,957,936 | B2* | 6/2011 | Eryurek et al. | 700/79 |
| 8,019,476 | B2* | 9/2011 | Kondo | 700/27 |
| 2002/0133240 | A1* | 9/2002 | Nagao et al. | 700/9 |
| 2005/0228517 | A1 | 10/2005 | Tomita | |
| 2009/0171479 | A1* | 7/2009 | Oosako | 700/79 |

OTHER PUBLICATIONS

Omron Electronics LLC, "Function Block Introduction Guide", Mar. 2005, obtained online at www.omron.com, Document No. R121-E1-01, One Commerce Drive, Schaumburg, IL 60173.*

Omron Electronics LLC, "Function Block/Structured Text Introduction Guide", 2007, obtained online at www.omron.com, Document No. R144-E1-02, One Commerce Drive, Schaumburg, IL 60173.*

Volker, N. and Kramer, B.J., "Modular Verification of Function Block Based Industrial Control Systems", Jun. 1999, Proceedings of Joint 24$^{th}$ IFAC/IFIP Workshop on Real-Time Programming and the Third International Workshop on Active and Real-Time Database Systems, Schlob Dagstuhl, Germany.*

Siemens, "IMCOx-PLC, Version 2.0, User Manual", Dec. 1999, Technical Description, Order No. 6AR1943-3AD00-2BA0.*

PLCopen, "Technical Specification—PLCopen—Technical Committee 2—Task Force—Function Blocks for Motion Control—Version 1.1", Apr. 2005, obtained online at www.PLCopen.org on Feb. 21, 2012.*

PLCopen, "Technical Specification—PLCopen—Technical Committee 2—Task Force—Function Blocks for Motion Control—Version 1.0", Nov. 2001, obtained online at www.PLCopen.org on Feb. 21, 2012.*

PLCopen, "Technical Paper—PLCopen—Technical Committee—Function Blocks for Motion Control: Part 2—Extensions", Sep. 2005, obtained online at www.PLCopen.org on Feb. 21, 2012.*

PLCopen, "Technical Paper—PLCopen—Technical Committee 2—Function Blocks for Motion Control: Part 3—User Guidelines", Apr. 2008, obtained online at www.PLCopen.org on Feb. 21, 2012.*

PLCopen, Technical Paper—PLCopen—Technical Committees 2 & 5—Logic, Motion, Safety, Apr. 2008, obtained online at www.PLCopen.org on Feb. 21, 2012.*

PROFIBUS, "PROFIBUS Guideline, PROFIBUS Communication and Proxy Function Blocks acc. to IEC 61131-3", Jul. 2001, Version 1.2, obtained online at www.pacontrol.com/download/PROFIBUS_Communication.pdf on Mar. 14, 2012.*

Thieme, J. and Hanisch, H.-M., "Model-based Generation of Modular PLC Code Using IEC61131 Function Blocks", 2002, Proceedings of the 2002 IEEE International Symposium on Industrial Electronics, vol. 1, p. 199-204.*

Fischer, J. and Boucher, T.O., "Workbook for Designing Distributed Control Applications Using Rockwell Automation's HOLOBLOC Prototyping Software", 2005, Working Paper No. 05-017, Rutgers Department of Industrial and System Engineering, Retrieved from the Internet at "http://ie.rutgers.edu/resource/research_paper/paper_05-017.pdf".*

Brennan et al., "An Agent Based Approach to Reconfiguration of Real-Time Distributed Control Systems", IEEE Transactions on Robotics and Automation, vol. 18, No. 4, Aug. 1, 2002.

European Search Report dated Oct. 18, 2011.

* cited by examiner

MOBILE FUNCTION BLOCK FOR A PLC BASED DISTRIBUTED CONTROL SYSTEM

CROSS REFERENCE TO RELATED APPLICATIONS

This application claims the benefit of U.S. Provisional Application No. 61/050,296, filed on May 5, 2008, the disclosure which is incorporated herein by reference in its entirety.

BACKGROUND OF THE INVENTION

The invention relates generally to Programmable Logic Controller (PLC) programming. More specifically, the invention relates to systems and methods that allow function blocks used in PLC programs to be copied to other PLCs during run-time in a distributed control system.

In today's automation environment, there is an increasing need for flexible, agile and reconfigurable control systems. Object-oriented distributed systems and agent-oriented software are widely adopted to increase availability, performance and acceptance of automation control systems.

At the low level of real-time Distributed Control Systems (DCSs), the objects and agents are usually hosted by PLCs and written using International Electrotechnical Commission (IEC) 61131-3 programming languages encapsulated in function blocks. Function blocks are the basic units of PLC programs and are well adopted by different PLC vendors.

With a functional block, a whole manufacturing/operation process can be encapsulated with an object wrapper. The major benefit of using function blocks is reduced engineering effort due to their reusability.

Traditionally, function block-based objects and agents are static. It is not necessary for the objects and agents to be mobile since their functionality is tied to the control of hardware, e.g., the hard-wired PLC control modules and input/output cards. However, with wireless technology development, the liaison of function blocks with hardware is loosened since more and more wireless PLC modules are available for real-time control of valves, pumps, and robots. If a function block based agent migrates to another host, it will reestablish the communication with the valves, pumps, robots, etc.

The second hindrance to the development of a PLC based mobile agent system is that current PLCs do not support mobile codes. Most PLC programs have to be configured and downloaded to the PLC during an engineering phase with vendor specific engineering tools and the program usually remains that way after deployment.

Communication between PLCs is usually limited to transferring data blocks excluding function blocks. With such constraints, if a PLC is required to cope with different control tasks, all of the function blocks supporting the variety of tasks have to be downloaded to it during the engineering phase. This significantly constrains the flexibility and scalability of PLC-based real-time DCSs.

While current PLCs can only obtain programs from their respective engineering tools, PLCs that could support mobile function blocks may obtain function blocks dynamically, from their peer PLCs across a DCS during run-time when the engineering tools are not present.

What is needed is a PLC method and architecture that supports function block mobility between different PLCs in mobile object/mobile agent based DCSs during run-time.

SUMMARY OF THE INVENTION

The inventors envision that it would be desirable to have a PLC method and architecture that supports function block mobility between different PLCs in mobile object/mobile agent based DCSs. Embodiments provide Mobile Function Block (MFB) mobility between PLCs. Each PLC configured with MFBs may forward and execute MFBs from each other. To enable MFB mobility over a communication bus, each PLC having one or more configured MFBs requires a Communication Function Block (CFB) and an MFB directory data block. Each PLC maintains an MFB directory data block to store its MFB directory which is used to check the availability of MFBs for it to run new tasks or respond to other PLCs' requests. The MFB directory data block contains task identifications (IDs), which represent which tasks the PLC is able to perform, the corresponding MFBs and the required memory size of each MFB.

One aspect of the invention provides a method for configuring a Programmable Logic Controller (PLC) to execute a program having function block mobility that controls a controlled component. Methods according to this aspect of the invention include defining the functional capability of a component controlled by the PLC as a program comprised of one or more function blocks, configuring one or more function blocks that can be commonly used as Mobile Function Blocks (MFBs), generating an MFB directory data block, configuring a Communication Function Block (CFB), programming the PLC based on the functional capability operating sequence, and downloading the program into the PLC.

Another aspect of the invention is enabling a PLC-controlled component to perform tasks which should be performed by a failed PLC-controlled component. Methods according to this aspect include acknowledging a failure in a component by a PLC controlling the component, broadcasting a request from the PLC controlling the failed component to other PLCs to find available controlled component resources wherein the request lists all tasks that control the failed component, receiving the task list request at a receiving PLC, comparing the task list request with the tasks listed in the receiving PLC's MFB directory data block, determining if any MFBs listed in the task list request match tasks in the receiving PLC's MFB directory data block, determining if the receiving PLC has enough pre-reserved memory to request needed MFBs to run the tasks if the receiving PLC does not have MFBs for some of the tasks, sending a reply from the receiving PLC to the requesting PLC if the receiving PLC has pre-reserved memory, copying the needed MFBs at the requesting PLC, forwarding the copied MFBs to the receiving PLC, updating the receiving PLC's MFB directory data block with the copied MFBs, and executing the tasks listed in the task list request by the receiving PLC.

Another aspect of the invention is a Programmable Logic Controller (PLC) system that executes a program having function block mobility that controls a controlled component. Systems according to this aspect include a program configured to define the functional capability of a component controlled by the PLC that includes one or more function blocks configured to be commonly used as Mobile Function Blocks (MFBs), an MFB directory data block that cross references task identification (ID), Function Block (FB) and MFBs, and FB and MFB memory requirements, and a Communication Function Block (CFB) configured to receive task list requests from other PLCs and manage the forwarding of MFBs, check the task IDs in the PLC's MFB directory data block and required memory for each MFB, and after receiving any needed MFBs, to update the PLC's MFB directory data block reflecting the added MFBs.

The details of one or more embodiments of the invention are set forth in the accompanying drawings and the descrip-

DETAILED

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of PLC software may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the PLC method and system may be implemented in software or hardware.

Embodiments of the invention provide methods, architectures, system frameworks, and a computer-usable medium storing computer-readable instructions for configuring new or existing control system architectures to use PLCs employing Mobile Function Blocks (MFBs). The invention may be deployed as software as an application program tangibly embodied on a program storage device. The application code for execution can reside on a plurality of different types of computer readable media known to those skilled in the art.

Figure 1:
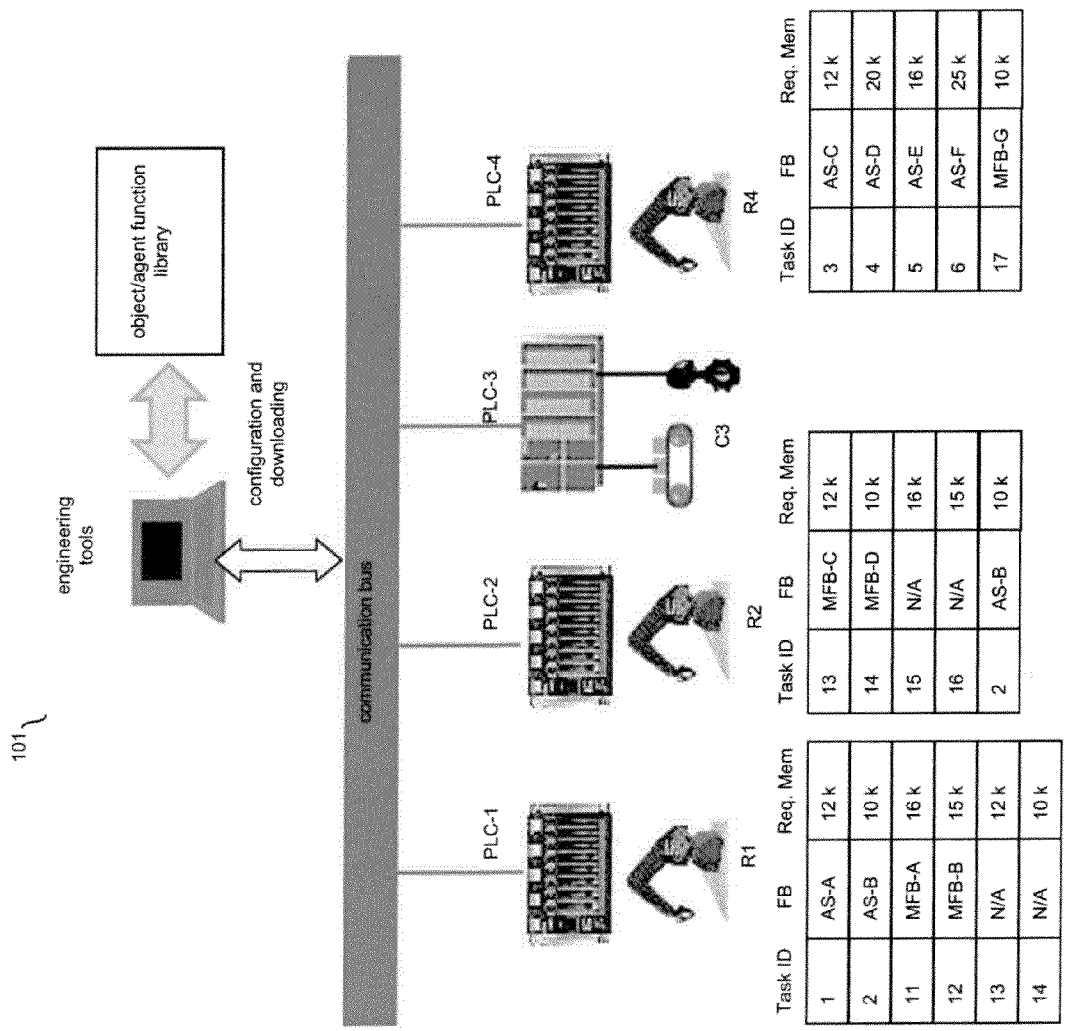
FIG. 1 is an exemplary PLC DCS architecture using four PLCs.

FIG. 1 shows a DCS architecture 101 using four PLCs PLC-1, PLC-2, PLC-3, PLC-4 that support the use of MFBs. The architecture 101 uses the four PLCs and their controlled components R1, R2, C3, R4 to manufacture a work piece that requires different operation tasks. PLC-1 controls robot arm R1, PLC-2 controls robot arm R2, PLC-3 controls conveyor C3 and PLC-4 controls robot arm R4. The task identification (ID) list for each PLC controlled robot arm R1, R2, R4 indicates all the tasks which can be performed by the PLC, with corresponding configured Application Specific (AS) function blocks and MFB names as shown in the MFB directory data blocks.

The PLCs communicate with each other over a communication bus. A device hosting engineering tools, such as a laptop computer running configuration and programming software, is connected to the communication bus to configure each PLC used in the architecture 101. An object/agent function block library provides reusable components for application programming that can be stored in other workstations.

By way of background, to configure a PLC, control systems engineers use programming software to create a program that the PLC will execute in conjunction with I/O card assignments. The program is then downloaded to a PLC. The PLC is placed in run-time and begins controlling a machine component, running a sequence of programming steps or functions that control the machine component. Controlled components may be articulated robots having rotary joints, conveyor systems having predetermined work station locations, Automatic Guided Vehicles (AGV) and other components. The one or more PLC programs are configured to operate in unison controlling more than one component.

During a control system configuration that includes more than one PLC, common control functionality may be identified among one or more similar types of controlled components. For example, architecture 101 assembles a part using three robot arms R1, R2, R4 and uses a conveyor C3 to position the part for each robot arm. The three robot arms are programmed to complement each other by building upon each other's past operations. However, some operations may not be unique to a particular position (particular robot arm), but are arbitrarily selected by the programmer. More than one robot arms may be configured to perform the same common task. For example, in FIG. 1, R1 is able to perform tasks 1, 2, 11, 12, 13 and 14. However, R1 does not have Function Blocks (FBs) to execute tasks 13 and 14. R2 is able to perform tasks 13, 14, 15, 16 and 2. However, R2 does not have FBs to execute tasks 15 and 16.

MFBs are configured based upon the same task that may be used by one or more other PLCs. For example, in the architecture 101, either robot arm R1 and R2 may perform the same task, but when the PLC programs were created, R2 was chosen to perform the task. FIG. 1 shows each PLC's doable task ID list.

There are necessary conditions for a function block to be mobile. Instead of allocating memory during the engineering phase, the PLC needs to be able to allocate pre-reserved memory during run-time to accept a new MFB. An MFB must also be capable of common use, meaning that executing the function block cannot have an adverse impact on the execution of other function blocks. Each MFB can be considered as an independent task to be executed by a PLC.

Figure 2:
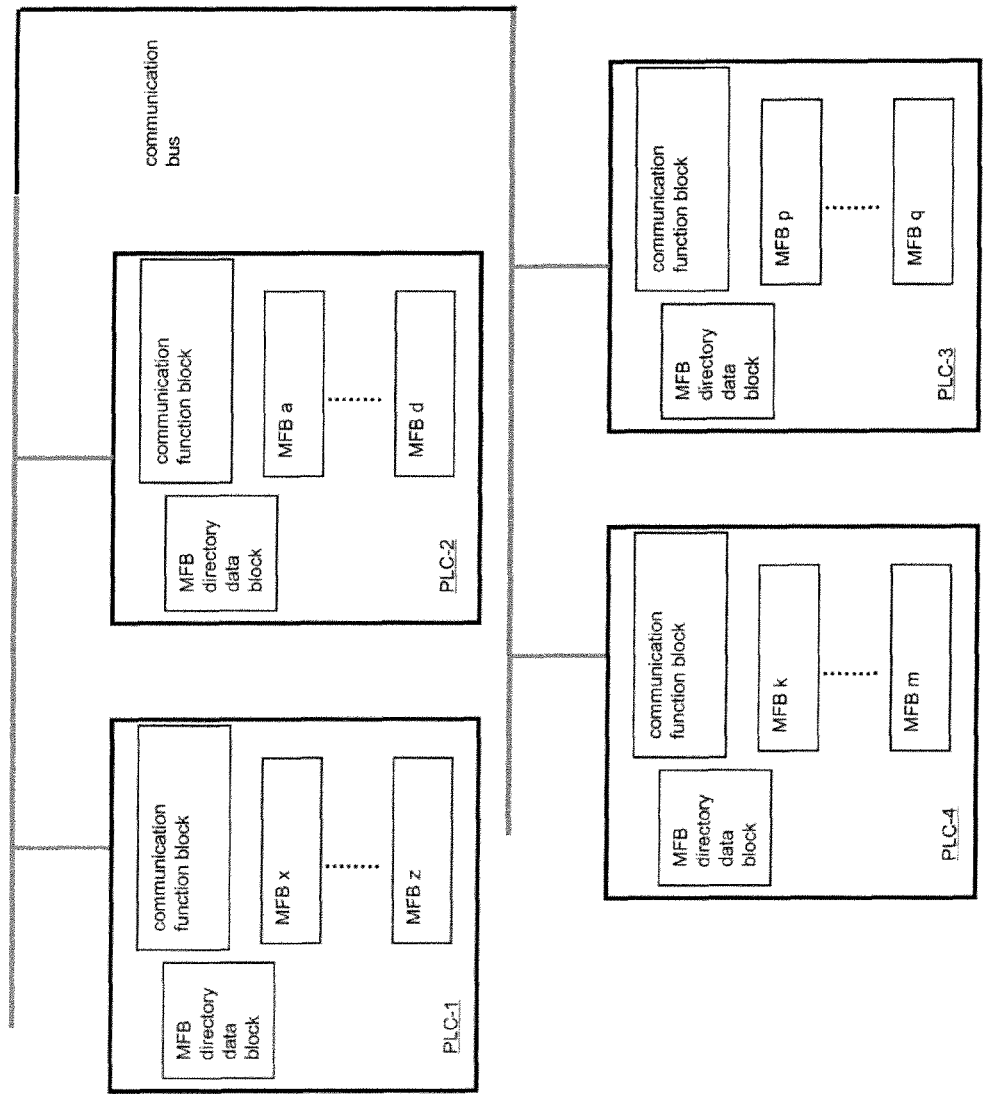
FIG. 2 is an exemplary system framework of each PLC used in FIG. 1.

FIG. 2 shows MFB mobility between PLC-1, PLC-2, PLC-3 and PLC-4. Each PLC configured with MFBs may forward and execute MFBs from each other. To enable MFB mobility over the communication bus, each PLC needs to have a Communication Function Block (CFB) and an MFB directory data block.

MFBs are function blocks that may be forwarded to other PLCs. They may be downloaded from the engineering tools or acquired from other PLCs during run-time. Each PLC maintains an MFB directory data block to store its MFB directory. The MFB directory data block contains a table whose first column lists all the tasks which can be performed by the PLC. The second column lists the corresponding function blocks (ASs or MFBs) to perform the task in column one. If there is no function block available for a task, the FB column is tagged "N/A." The third column of the MFB directory data block shows the required memory size of each function block. The MFB directory data block is used by each PLC to determine if it can take over some of the tasks performed by another PLC (the first column). The directory is also used when other PLCs send requests to check the availability of some function blocks they need to run new tasks (the second column). In addition, the MFB directory data block also maintains the memory requirements of MFBs for a PLC to decide if it can allocate memory to obtain an MFB to fulfill a task. For example, if robot arm R2, which is performing tasks 13, 14 and 2 fails, PLC-2 (R2) broadcasts a request over the communication bus for a task list of tasks 13, 14 and 2. When PLC-3 (R3) receives the request, it finds that it is not able to perform tasks 2, 13 or 14, and keeps silent. When PLC-1 (R1) receives the request, it finds it is able to perform tasks 2, 13 and 14. However, it does not have the FBs to perform tasks 13 and 14. When PLC-1 checks that it has enough memory to accommodate the necessary FBs, it sends a request for MFBs to PLC-2 over the communication bus.

The CFB is used to handle the proper transmission of MFBs and to synchronize operations among resources. For example, in FIGS. 1 and 2, the CFB in PLC-1 receives the request from PLC-2 (R2), checks its task IDs, available FBs, and required memory for each FB. The CFB also sends a request to PLC-2 to obtain MFB-C and MFB-D, which are used to perform tasks 13 and 14. After receiving MFB-C and MFB-D, the CFB in PLC-1 will update the MFB directory data table reflecting the added MFBs.

Figure 3:
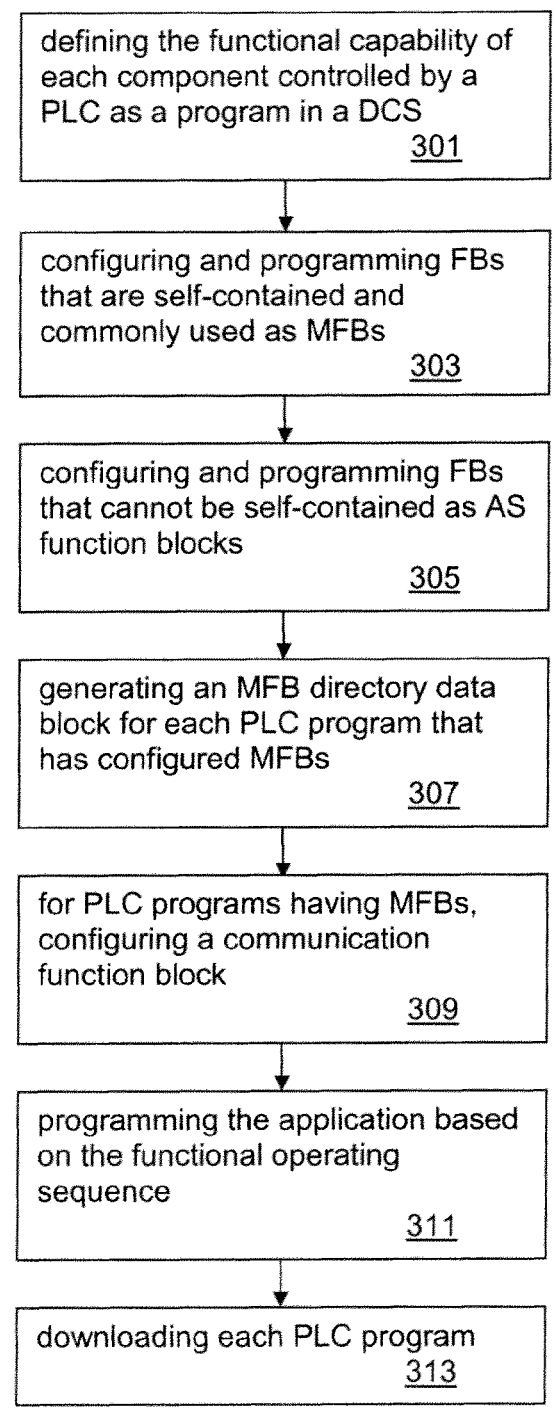
FIG. 3 is an exemplary Mobile Function Block (MFB) configuration.

FIG. 3 shows an MFB configuration method. To configure an MFB, the required PLC functionality for each PLC controlled component is assembled using interconnected function blocks from a library of object/agent function block types to create a program for that component's PLC. The functional capability of each manufacturing component is defined (step 301). For example, in FIG. 1, R1 is able to perform tasks 1, 2, 11, 12, 13 and 14.

Operations that are considered common are identified as MFBs that have mobility for the application. For example, FB_Buffering, FB_move, FB_Convey, FB_machining (step 303). AS function blocks (not MFBs) for that controlled component are configured (step 305). For example, in FIG. 1, AS-A and AS-B perform tasks 1 and 2, respectively. MFB-A and MFB-B perform tasks 11 and 12, respectively. R1 is also able to perform tasks 13 and 14, however, no corresponding FBs were configured during the engineering phase.

An MFB directory data block is constructed for each PLC program where MFBs are used, tabulating the MFBs and AS FBs (step 307). Each MFB directory data block includes defined MFBs that are executable on that PLC with an indication to show if it is available locally. To manage each MFB directory data block, a CFB is configured using the PLC engineering tools by inserting a CFB from the function library for each PLC.

Each PLC application is programmed based on the operating component sequence (step 311). After the architecture 101 configuration is complete, each PLC program is downloaded with its MFB directory data block and CFB to their respective PLCs (step 313). The engineering tools are typically removed from the communication bus and the one or more PLCs placed in run-time. Each PLC (PLC-1, PLC-2, PLC-3, PLC-4) may communicate with each other over the communication bus and may adjust its control strategy using MFBs to execute new tasks.

Figure 4A:
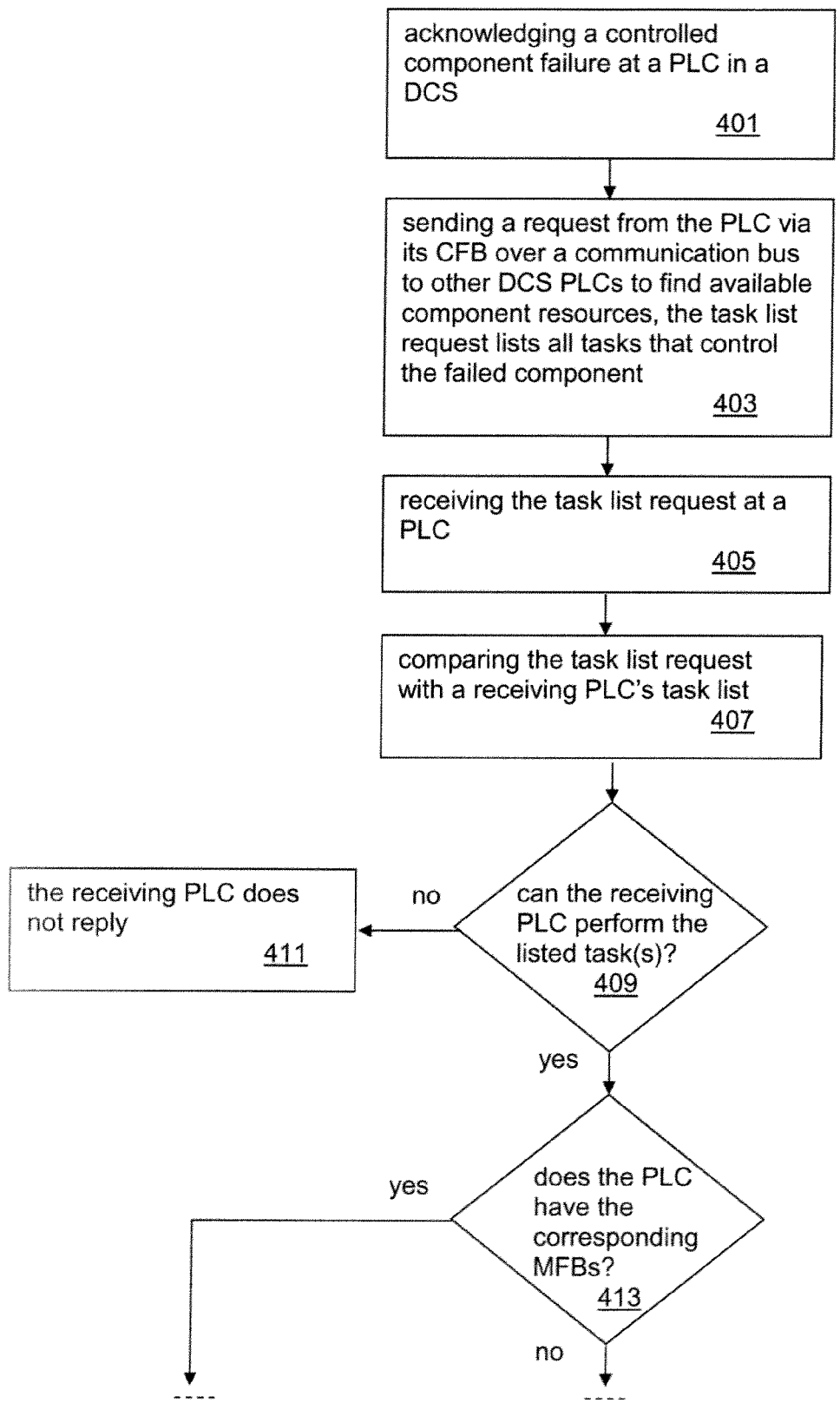
FIG. 4 is an exemplary run-time operation among a plurality of PLCs supporting MFBs.
Figure 4B:
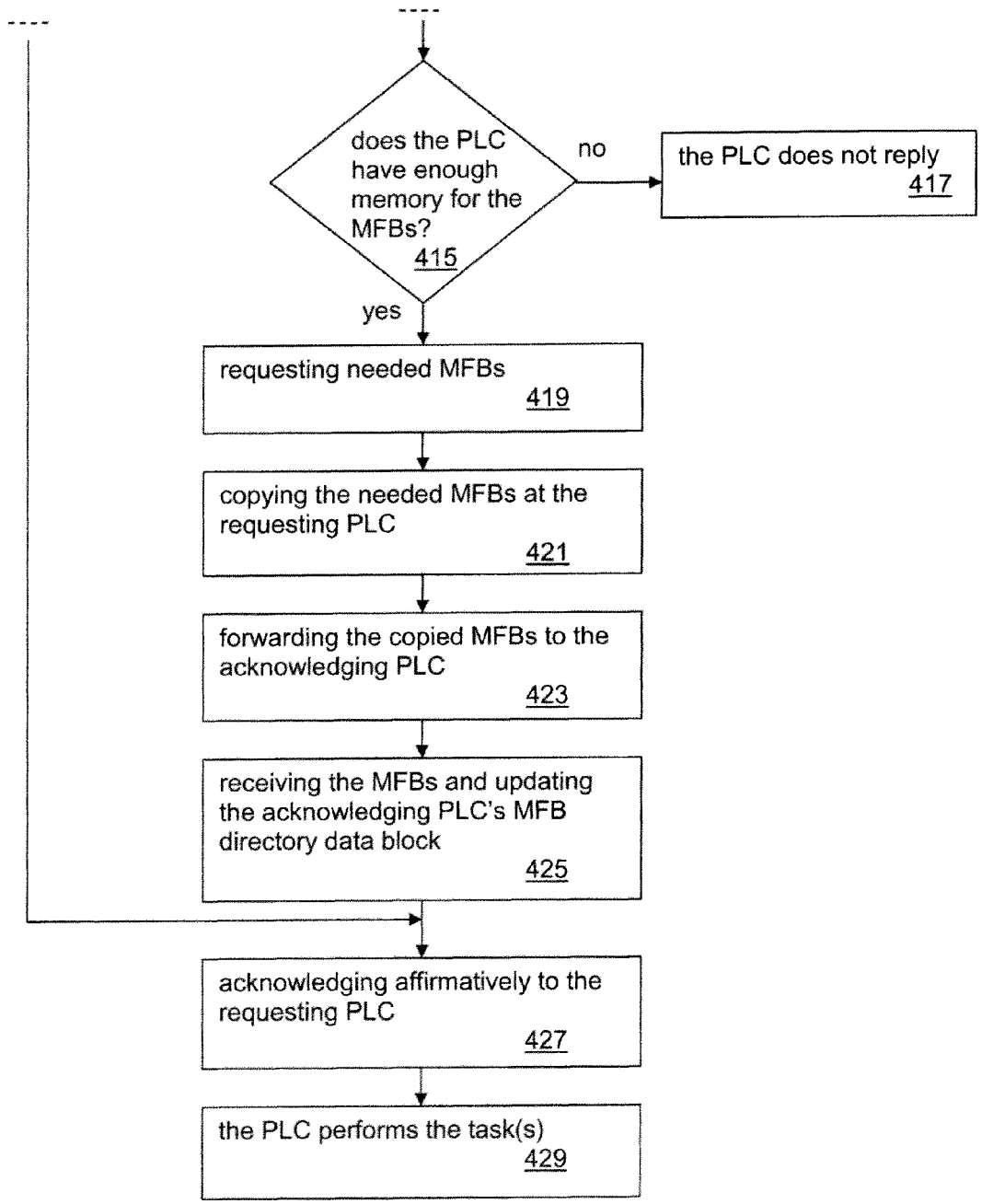

FIG. 4 shows a method of PLCs supporting MFBs during run-time. For the architecture 101, if one of the controlled components fail, for example, robot arm R2, the component failure is acknowledged by PLC-2 (step 401) and an alarm is broadcast from PLC-2 to the other PLCs (step 403). All other interconnected PLCs PLC-1, PLC-3, PLC-4 receive a task request (step 405) which lists all of the tasks performed by the failed component (R2). For example, PLC-2 sends a task list request message that includes tasks 13, 14 and 2.

The task list request message is received via a receiving PLC's CFB and is compared with the receiving PLC's task list (steps 407, 409). For example, PLC-4 performs a comparison and determines it is not able to perform tasks 13, 14 or 2 and does not reply (step 411). PLC-1 performs a comparison and determines it is able to perform tasks 13, 14 and 2 and checks if it has the corresponding MFBs (step 413). If it does have the corresponding MFBs, it will acknowledge affirmatively to PLC-2 and perform the tasks (steps 427, 429). If it does not have the corresponding MFBs, it checks if it has enough memory to accommodate the MFBs (step 415). If it does not have sufficient memory, the PLC will not reply (step 417). If it does have sufficient memory, it will reply with a request of the needed MFBs to the requesting PLC (step 419). For example, PLC-1 will send a request for MFB-C and MFB-D to PLC-2.

The requesting PLC copies (step 421) and forwards (step 423) the needed MFBs to the acknowledging PLC. For example, PLC-2 copies MFB-C ad MFB-D and forwards them to PLC-1.

The acknowledging PLC receives the needed MFBs and updates its MFB directory data block (step 425).

The acknowledging PLC acknowledges affirmatively to the requesting PLC (step 427). For example, PLC-1 sends an affirmative acknowledgement to PLC-2. The acknowledging PLC performs the tasks (step 429).

One issue for MFBs is code portability. An MFB must be able to be executed on every PLC in a DCS. Mobile code running on Personal Computers (PCs) may be executed based on systems like Java and Java virtual machines where classes may be loaded at runtime over the network. For real-time PLC based DCSs, MFB portability is supported by PLC vendors whose engineering tools can compile the function blocks into an intermediate language which is downloaded to a PLC and which can be interpreted or compiled into machine code by the PLC regardless of their hardware platforms. For example, Siemens SIMATIC Step 7 and S7 PLCs are designed with such capability. MFBs may be transmitted to and executed on all the SIMATIC PLCs.

Using CFBs and MFB directory data blocks in conjunction with AS function blocks which are part of a PLC program, a DCS may be enabled with mobile object/mobile agent capability.

MFBs may be used in different operating scenarios. For example, for use in a flexible manufacturing system where a plant cell for discrete manufacturing is capable of handling different types of work parts using a highly available agent-based DCS. The situation where MFBs may be transmitted may be for a new type of work part scheduled for processing which requires different operations. To use the controlled components more efficiently, the functions of each component may be reconfigured. Each controlled component may exchange MFBs over a communication bus to continue service. In another example, if one controlled component fails (R2 fails), the operations it performs must be resumed using the other controlled components (R1 and/or R4). The PLC controlling the failed component sends MFBs to one or more PLC controlling a like component that can resume its tasks.

In another example, a building automation control system may use MFBs for remote evaluation to monitor the HVAC control system performance as well as energy efficiency. To fulfill a performance contract, the building automation provider may need to install a building performance monitor module inside the building management system. The module runs a building simulation program interacting with PLC simulation software on a high performance PC to predict the expected temperature/humidity/energy consumption of the building zones. The predicted result is compared with real measurement data. If there is a discrepancy, an investigation/maintenance/service will be arranged. The function blocks running in the PLC simulation program have to reflect the latest run-time system. Therefore, room/zone/chiller/heater PLCs send MFBs to the performance monitor system frequently.

One or more embodiments of the present invention have been described. Nevertheless, it will be understood that various modifications may be made without departing from the spirit and scope of the invention. Accordingly, other embodiments are within the scope of the following claims.

What is claimed is:

1. A system for configuring a Programmable Logic Controller (PLC) to execute a program having function block mobility that controls a controlled component comprising:
   a PLC component for defining the functional capability of a component controlled by the PLC as a program comprised of one or more function blocks;
   a PLC component for configuring one or more function blocks that can be commonly used as Mobile Function Blocks (MFBs);
   a PLC component for generating an MFB directory data block, wherein the MFB directory data block cross references an MFB with a task list identity (ID);
   a PLC component for configuring a Communication Function Block (CFB), wherein the CFB manages the forwarding and receiving of MFBs between PLCs;
   a PLC component for programming the PLC based on the functional capability operating sequence; and
   a PLC component for downloading the program into the PLC.

2. The system according to claim 1 wherein an executing MFB does not impact the execution of other function blocks.

3. The system according to claim 1 wherein an MFB allows for allocating pre-reserved memory during run-time.

4. The system according to claim 1 wherein the CFB is configured from a standard function library.

5. The system according to claim 1 wherein the MFB directory data block cross references an amount of pre-reserved memory needed for each task ID.

6. The system according to claim 1 further comprising:
   a PLC component for enabling a PLC-controlled component to perform tasks which should be performed by a failed PLC-controlled component comprising:
      a PLC component for acknowledging a failure in a component by a PLC controlling the component;
      a PLC component for broadcasting a request from the PLC controlling the failed component to other PLCs to find available controlled component resources wherein the request lists all tasks that control the failed component;
      a PLC component for receiving the task list request at a receiving PLC;
      a PLC component for comparing the task list request with the tasks listed in the receiving PLC's MFB directory data block;
      a PLC component for determining if any MFBs listed in the task list request match tasks in the receiving PLC's MFB directory data block;
      a PLC component for determining if the receiving PLC has enough pre-reserved memory to request needed MFBs to run the tasks if the receiving PLC does not have MFBs for some of the tasks:
      a PLC component for sending a reply from the receiving PLC to the requesting PLC if the receiving PLC has pre-reserved memory;
      a PLC component for copying the needed MFBs at the requesting PLC;
      a PLC component for forwarding the copied MFBs to the receiving PLC;
      a PLC component for updating the receiving PLC's MFB directory data block with the copied MFBs; and
      a PLC component for executing the tasks listed in the task list request by the receiving PLC.

7. The system according to claim 1 further comprising:
   a PLC component for acknowledging a component failure by the PLC controlling the component;
   a PLC component for sending a request from the PLC controlling the failed component over a communication bus to one or more other PLCs to find available controlled component resources wherein the request includes a task list of all tasks that control the failed component;
   a PLC component for receiving the task list request at a receiving PLC;
   a PLC component for comparing the task list request with the receiving PLC's task list in the MFB directory data block;
   a PLC component for determining if the tasks listed in the task list request are in the receiving PLC's task list; and
   if the receiving PLC cannot perform the tasks listed in the task list request, no reply is sent from the receiving PLC to the requesting PLC.

8. The system according to claim 7 further comprising:
   if the receiving PLC can perform the tasks listed in the task list request, a PLC component for determining if the receiving PLC has the MFBs identified in the task list request;
   if the receiving PLC has the MFBs identified in the task list request, a PLC component for replying to the requesting PLC; and
   a PLC component for executing the tasks listed in the task list request by the receiving PLC.

9. The system according to claim 8 further comprising:
   if the receiving PLC can perform the tasks listed in the task list request but does not have all of the MFBs identified in the task list request, a PLC component for determining if the receiving PLC has pre-reserved memory for the needed MFBs; and
   if the receiving PLC does not have pre-reserved memory for the needed MFBs, no reply is sent from the receiving PLC to the requesting PLC.

10. The system according to claim 8 further comprising:
    if the receiving PLC can perform the tasks listed in the task list request but does not have all of the MFBs identified in the task list request, a PLC component for determining if the receiving PLC has pre-reserved memory for the needed MFBs; and
    if the receiving PLC does have pre-reserved memory for the needed MFBs, a PLC component for requesting the needed MFBs from the requesting PLC.

11. The system according to claim 10 further comprising:
    a PLC component for copying the needed MFBs at the requesting PLC;
    a PLC component for forwarding the copied MFBs to the receiving PLC;

a PLC component for receiving the copied MFBs at the receiving PLC;

a PLC component for updating the receiving PLC's MFB directory data block with the copied MFBs; and a PLC component for executing the tasks listed in the task list request by the receiving PLC.

12. A method for configuring a Programmable Logic Controller (PLC) to execute a program having function block mobility that controls a controlled component comprising:

defining the functional capability of a component controlled by the PLC as a program comprised of one or more function blocks;

configuring one or more function blocks that can be commonly used as Mobile Function Blocks (MFBs);

generating an MFB directory data block, wherein the MFB directory data block cross references an MFB with a task list identity (ID);

configuring a Communication Function Block (CFB), wherein the CFB manages the forwarding and receiving of MFBs between PLCs;

programming the PLC based on the functional capability operating sequence; and downloading the program into the PLC.

13. The method according to claim 12 wherein the MFB directory data block cross references an amount of pre-reserved memory needed for each task ID.

14. The method according to claim 12 wherein the CFB is configured from a standard function library.

15. The method according to claim 12 wherein an executing MFB does not impact the execution of other function blocks.

16. The method according to claim 12 wherein an MFB allows for allocating pre-reserved memory during run-time.

17. The method according to claim 12 further comprising:

enabling a PLC-controlled component to perform tasks which should be performed by a failed PLC-controlled component comprising:

acknowledging a failure in a component by a PLC controlling the component;

broadcasting a request from the PLC controlling the failed component to other PLCs to find available controlled component resources wherein the request lists all tasks that control the failed component;

receiving the task list request at a receiving PLC;

comparing the task list request with the tasks listed in the receiving PLC's MFB directory data block;

determining if any MFBs listed in the task list request match tasks in the receiving PLC's MFB directory data block;

determining if the receiving PLC has enough pre-reserved memory to request needed MFBs to run the tasks if the receiving PLC does not have MFBs for some of the tasks;

sending a reply from the receiving PLC to the requesting PLC if the receiving PLC has pre-reserved memory;

copying the needed MFBs at the requesting PLC;

forwarding the copied MFBs to the receiving PLC;

updating the receiving PLC's MFB directory data block with the copied MFBs; and executing the tasks listed in the task list request by the receiving PLC.

18. The method according to claim 12 further comprising:

acknowledging a component failure by the PLC controlling the component;

sending a request from the PLC controlling the failed component over a communication bus to one or more other PLCs to find available controlled component resources wherein the request includes a task list of all tasks that control the failed component;

receiving the task list request at a receiving PLC;

comparing the task list request with the receiving PLC's task list in the MFB directory data block;

determining if the tasks listed in the task list request are in the receiving PLC's task list; and if the receiving PLC cannot perform the tasks listed in the task list request, no reply is sent from the receiving PLC to the requesting PLC.

19. The method according to claim 18 further comprising:

if the receiving PLC can perform the tasks listed in the task list request, determining if the receiving PLC has the MFBs identified in the task list request;

if the receiving PLC has the MFBs identified in the task list request, replying to the requesting PLC; and executing the tasks listed in the task list request by the receiving PLC.

20. The method according to claim 19 further comprising:

if the receiving PLC can perform the tasks listed in the task list request but does not have all of the MFBs identified in the task list request, determining if the receiving PLC has pre-reserved memory for the needed MFBs; and if the receiving PLC does not have pre-reserved memory for the needed MFBs, no reply is sent from the receiving PLC to the requesting PLC.

21. The method according to claim 19 further comprising:

if the receiving PLC can perform the tasks listed in the task list request but does not have all of the MFBs identified in the task list request, determining if the receiving PLC has pre-reserved memory for the needed MFBs; and if the receiving PLC does have pre-reserved memory for the needed MFBs, requesting the needed MFBs from the requesting PLC.

22. The method according to claim 21 further comprising:

copying the needed MFBs at the requesting PLC;

forwarding the copied MFBs to the receiving PLC;

receiving the copied MFBs at the receiving PLC;

updating the receiving PLC's MFB directory data block with the copied MFBs; and executing the tasks listed in the task list request by the receiving PLC.

23. A Programmable Logic Controller (PLC) that executes a program having function block mobility that controls a controlled component comprising:

a program configured to define the functional capability of a component controlled by the PLC that includes one or more function blocks configured to be commonly used as Mobile Function Blocks (MFBs);

an MFB directory data block that cross references task identification (ID), Function Block (FB) and MFBs, and FB and MFB memory requirements; and a Communication Function Block (CFB) configured to receive task list requests from other PLCs and manage the forwarding and receiving of MFBs between PLCs, check the task IDs in the PLC's MFB directory data block and required memory for each MFB, and after receiving any needed MFBs, to update the PLC's MFB directory data block reflecting the added MFBs.

* * * * *